United States Patent
Kukehalli Subramanya et al.

(10) Patent No.: US 10,581,826 B2
(45) Date of Patent: Mar. 3, 2020

(54) RUN-TIME TRUST MANAGEMENT SYSTEM FOR ACCESS IMPERSONATION

(71) Applicant: Oracle International Corporation, Redwood Shores, CA (US)

(72) Inventors: Ramya Kukehalli Subramanya, Redmond, WA (US); Stephen Mathew, Bangalore (IN); Vipin Anaparakkal Koottayi, Trikarpur (IN)

(73) Assignee: Oracle International Corporation, Redwood Shores ( * ) Notice: Subject to any disclaimer, the term of this patent is extended or adjusted under 35 U.S.C. 154(b) by 447 days.

(21) Appl. No.: 15/291,804

(22) Filed: Oct. 12, 2016

(65) Prior Publication Data
US 2017/0118222 A1 Apr. 27, 2017

Related U.S. Application Data

(60) Provisional application No. 62/245,202, filed on Oct. 22, 2015.

(51) Int. Cl.
*H04L 29/06* (2006.01)
(52) U.S. Cl.
CPC ...... *H04L 63/0815* (2013.01); *H04L 63/0807* (2013.01)
(58) Field of Classification Search
CPC .................. H04L 63/0815; H04L 63/0807
(Continued)

(56) References Cited

U.S. PATENT DOCUMENTS

| | | | |
|---|---|---|---|
| 6,041,357 A | 3/2000 | Kunzelman et al. |
| 6,055,637 A | 4/2000 | Hudson et al. |

(Continued)

FOREIGN PATENT DOCUMENTS

| | | |
|---|---|---|
| EP | 1864240 | 12/2007 |
| WO | 2013049461 | 4/2013 |

(Continued)

OTHER PUBLICATIONS

U.S. Appl. No. 14/754,222 Non-Final Office Action, dated Dec. 1, 2016, 10 pages.

(Continued)

*Primary Examiner* — Mahfuzur Rahman
(74) *Attorney, Agent, or Firm* — Kilpatrick Townsend & Stockton LLP

(57) ABSTRACT

Techniques are disclosed for facilitating impersonation for accessing resources through an access management system. When a user ("impersonator") requests access to impersonate another user ("impersonatee"), the access management system may generate security data having two parts. One part may include a first security key that is sent to the impersonator and a second part may include a second security key that is sent to the impersonatee. Receipt of the second security key notifies the impersonatee about a request for impersonation to access a resource according to access permitted to the impersonatee. The impersonatee, if consenting to impersonation, may provide the security key received to the impersonator, thereby implicitly providing the impersonator with trust at run-time to access the resource. Upon verification of both security keys, by the access management system, access to a resource is provided to the impersonator based on access to the resource permitted to the impersonatee.

20 Claims, 8 Drawing Sheets

(58) Field of Classification Search
USPC .......................................................... 726/4
See application file for complete search history.

(56) References Cited

U.S. PATENT DOCUMENTS

| | | |
|---|---|---|
| 6,076,108 A | 6/2000 | Courts et al. |
| 6,178,511 B1 | 1/2001 | Cohen et al. |
| 6,338,064 B1 | 1/2002 | Ault et al. |
| 6,385,724 B1 | 5/2002 | Beckman et al. |
| 6,430,619 B1 | 8/2002 | Sitaraman et al. |
| 6,811,873 B2 | 11/2004 | Nadkarni |
| 7,100,195 B1 | 8/2006 | Underwood |
| 7,137,006 B1 | 11/2006 | Grandcolas et al. |
| 7,225,256 B2 | 5/2007 | Villavicencio |
| 7,296,290 B2 | 11/2007 | Barriga et al. |
| 7,426,642 B2 | 9/2008 | Aupperle et al. |
| 7,437,594 B1 | 10/2008 | Mount et al. |
| 7,496,953 B2 | 2/2009 | Andreev et al. |
| 7,525,938 B2 | 4/2009 | Hurtta |
| 7,747,746 B2 | 6/2010 | Thayer et al. |
| 7,761,911 B2 | 7/2010 | Song et al. |
| 7,805,529 B2 | 9/2010 | Galluzzo et al. |
| 7,805,757 B2 | 9/2010 | Menten |
| 7,818,582 B2 | 10/2010 | Marion et al. |
| 7,886,000 B1 | 2/2011 | Calone et al. |
| 7,908,380 B1 | 3/2011 | Chu et al. |
| 7,996,376 B2 | 8/2011 | Singh et al. |
| 8,001,232 B1 | 8/2011 | Saulpaughet al. |
| 8,073,954 B1 | 12/2011 | Tu et al. |
| 8,117,649 B2 | 2/2012 | Hardt |
| 8,244,907 B2 | 8/2012 | Hinton et al. |
| 8,365,266 B2 | 1/2013 | Bogner et al. |
| 8,438,635 B2 | 5/2013 | Das et al. |
| 8,442,943 B2 | 5/2013 | Multer et al. |
| 8,468,586 B2 | 6/2013 | Koottayi et al. |
| 8,495,195 B1 | 7/2013 | Abidogun et al. |
| 8,544,069 B1 | 9/2013 | Subbiah et al. |
| 8,611,873 B2 | 12/2013 | Onyon et al. |
| 8,627,435 B2 | 1/2014 | Sirota et al. |
| 8,627,479 B2 | 1/2014 | Wittenstein et al. |
| 8,650,305 B2 | 2/2014 | Booth et al. |
| 8,719,342 B2 | 5/2014 | Mutikainen et al. |
| 8,738,774 B2 | 5/2014 | Sheng et al. |
| 8,756,704 B2 | 6/2014 | Castellucci et al. |
| 8,819,444 B2 | 8/2014 | Shahbazi et al. |
| 8,843,997 B1 | 9/2014 | Hare |
| 8,898,765 B2 | 11/2014 | Goyal et al. |
| 8,955,037 B2 | 2/2015 | Srinivasan et al. |
| 8,990,909 B2 | 3/2015 | Kelley |
| 9,083,690 B2 | 7/2015 | Subramanya et al. |
| 9,104,451 B2 | 8/2015 | Subramanya et al. |
| 9,124,582 B2 | 9/2015 | Kalinichenko et al. |
| 9,225,744 B1* | 12/2015 | Behm ..................... H04L 63/20 |
| 9,230,003 B2 | 1/2016 | Goetsch |
| 9,240,886 B1* | 1/2016 | Allen ..................... H04L 9/32 |
| 9,247,006 B2 | 1/2016 | Mathew et al. |
| 9,405,887 B2 | 8/2016 | Yin et al. |
| 9,509,684 B1* | 11/2016 | Dixson-Boles ....... H04L 63/083 |
| 9,544,293 B2 | 1/2017 | Mathew et al. |
| 9,769,147 B2 | 9/2017 | Mathew et al. |
| 9,866,640 B2 | 1/2018 | Motukuru et al. |
| 9,887,981 B2 | 2/2018 | Mathew et al. |
| 10,009,335 B2 | 6/2018 | Mathew et al. |
| 10,084,769 B2 | 9/2018 | Mathew et al. |
| 2002/0029269 A1 | 3/2002 | McCarty et al. |
| 2002/0078365 A1 | 6/2002 | Burnett et al. |
| 2003/0105862 A1* | 6/2003 | Villavicencio ......... H04L 63/08 709/225 |
| 2004/0003259 A1 | 1/2004 | Chang et al. |
| 2004/0073666 A1 | 4/2004 | Foster et al. |
| 2005/0091655 A1 | 4/2005 | Probert et al. |
| 2005/0108570 A1 | 5/2005 | Gopalraj |
| 2005/0120091 A1 | 6/2005 | Casais et al. |
| 2005/0144482 A1 | 6/2005 | Anuszewski et al. |
| 2006/0059546 A1 | 3/2006 | Nester et al. |
| 2006/0218630 A1 | 9/2006 | Pearson et al. |
| 2006/0236382 A1 | 10/2006 | Hinton et al. |
| 2006/0277596 A1 | 12/2006 | Calvert et al. |
| 2007/0089167 A1* | 4/2007 | Villavicencio ......... H04L 63/08 726/5 |
| 2007/0147247 A1 | 6/2007 | Kalonji et al. |
| 2007/0192326 A1 | 8/2007 | Angal et al. |
| 2007/0220154 A1* | 9/2007 | El Husseini ........ H04L 63/0281 709/227 |
| 2008/0066159 A1* | 3/2008 | Dillaway ................. G06F 21/62 726/4 |
| 2008/0114883 A1 | 5/2008 | Singh et al. |
| 2008/0294781 A1 | 11/2008 | Hinton et al. |
| 2009/0037581 A1 | 2/2009 | Richardson et al. |
| 2009/0037763 A1 | 2/2009 | Adhya et al. |
| 2009/0047928 A1 | 2/2009 | Utsch et al. |
| 2009/0089437 A1 | 4/2009 | Polozoff |
| 2009/0132639 A1 | 5/2009 | Yan |
| 2009/0292927 A1 | 11/2009 | Wenzel et al. |
| 2010/0043062 A1 | 2/2010 | Alexander et al. |
| 2010/0082989 A1* | 4/2010 | Bussard ............... G06F 21/6218 713/176 |
| 2010/0131755 A1 | 5/2010 | Zhu et al. |
| 2010/0146611 A1 | 6/2010 | Kuzin et al. |
| 2010/0154043 A1 | 6/2010 | Castellucci et al. |
| 2010/0290392 A1 | 11/2010 | Rasanen et al. |
| 2011/0173643 A1* | 7/2011 | Nicolson ............... G06F 21/575 719/328 |
| 2011/0185421 A1 | 7/2011 | Wittenstein et al. |
| 2011/0307615 A1 | 12/2011 | Krishnaswamy et al. |
| 2012/0078708 A1 | 3/2012 | Taylor et al. |
| 2012/0106333 A1 | 5/2012 | Lee et al. |
| 2012/0191842 A1 | 7/2012 | Hu et al. |
| 2012/0254949 A1 | 10/2012 | Mikkonen et al. |
| 2012/0254957 A1 | 10/2012 | Fork et al. |
| 2012/0266229 A1 | 10/2012 | Simone et al. |
| 2012/0291090 A1 | 11/2012 | Srinivasan et al. |
| 2013/0036454 A1 | 2/2013 | Purvis et al. |
| 2013/0073670 A1 | 3/2013 | Das et al. |
| 2013/0086651 A1 | 4/2013 | Kavantzas et al. |
| 2013/0086652 A1 | 4/2013 | Kavantzas et al. |
| 2013/0198818 A1 | 8/2013 | Hitchcock et al. |
| 2014/0025939 A1* | 1/2014 | Smith ..................... G06F 9/24 713/2 |
| 2014/0068702 A1 | 3/2014 | Hyndman et al. |
| 2014/0149280 A1 | 5/2014 | Karkhanis et al. |
| 2014/0344326 A1 | 11/2014 | Kamath et al. |
| 2015/0074407 A1 | 3/2015 | Palmeri et al. |
| 2015/0082029 A1 | 3/2015 | Volchok |
| 2015/0088978 A1 | 3/2015 | Motukuru et al. |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089579 A1 | 3/2015 | Manza et al. |
| 2015/0089580 A1 | 3/2015 | Manza et al. |
| 2015/0089596 A1 | 3/2015 | Sondhi et al. |
| 2015/0089597 A1 | 3/2015 | Srinivasan et al. |
| 2015/0089604 A1 | 3/2015 | Mathew et al. |
| 2015/0089614 A1 | 3/2015 | Mathew et al. |
| 2015/0089617 A1 | 3/2015 | Sondhi et al. |
| 2015/0089619 A1 | 3/2015 | Manza et al. |
| 2015/0089620 A1 | 3/2015 | Manza et al. |
| 2015/0089622 A1 | 3/2015 | Sondhi et al. |
| 2015/0089623 A1 | 3/2015 | Sondhi et al. |
| 2015/0220713 A1 | 8/2015 | Beenau et al. |
| 2015/0220926 A1 | 8/2015 | McLachlan et al. |
| 2016/0065570 A1 | 3/2016 | Spencer, III et al. |
| 2016/0219040 A1 | 7/2016 | Mathew et al. |
| 2016/0248758 A1 | 8/2016 | Mathew et al. |
| 2016/0285822 A1 | 9/2016 | Adams |
| 2016/0381000 A1 | 12/2016 | Mathew et al. |
| 2017/0034152 A1 | 2/2017 | Subramanya et al. |
| 2017/0085556 A1 | 3/2017 | Mathew et al. |
| 2017/0118218 A1 | 4/2017 | Koottayi et al. |
| 2017/0118249 A1 | 4/2017 | Motukuru et al. |
| 2018/0046794 A1 | 2/2018 | Mathew et al. |

(56) References Cited

U.S. PATENT DOCUMENTS

2018/0077243 A1 3/2018 Mathew et al.
2018/0157825 A1* 6/2018 Eksten .................... G06F 21/64

FOREIGN PATENT DOCUMENTS

| WO | 2015042546 | 3/2015 |
|---|---|---|
| WO | 2015042547 | 3/2015 |
| WO | WO2016051240 | 4/2016 |

OTHER PUBLICATIONS

"User Session Monitoring for CA Single Sign-On," CA Technologies, Copyright 2015 http://ww.ca.com/~/media/Files/Add-OnServicesComponents/user-session-monitor-for-ca-single-sign-on.pdf, 1 page.
"The art of logging out," KTH Sweden, Apr. 26, 2013 https://www.kth.se/social/group/cas/page/the-art-of-logging-out/, 2 pages.
"IBM Security Access Manager for Enterprise Single Sign-On" retrieved from the Internet Nov. 10, 2016: http://www-03.ibm.com/software/products/en/access-mgr-esso, 2 pages.
"Understanding Jive Mobile's SSO Compliance," Jive Software, Jun. 25, 2012 https://community.jivesoftware.com/docs/DOC-61829, 11 pages.
"Implementing Single Sign-On Across Multiple Organizations", Developer.force.com, http://wiki.developerforce.com/page/Implementing_Single_Sign-On_Across_Multiple_Organizations; Accessed on Dec. 19, 2013.
"Big-IP Access Policy Manager", http://www.f5.com/pdf/products/big-ip-access-policy-manager-ds.pdf (copyright 2013).
Ferguson, A. and Hockings, C. Session management server: Session transitions and state. ibm.com/developerworks/ [online]. Jun. 25, 2007, IBM [retrieved May 18, 2015]. Retrieved from the Internet: <URL:http://www.ibm.com/developerworks/tivoli/library/t-sms-states/>, 7 pages.
Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.
IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.
Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.
Mortimore, C. and Yewell, E. Implementing Single Sign-On Across Multiple Organizations. developer.salesforce.com [online]. Copyright 2000-2014 salesforce.com, Inc. [retrieved Jan. 7, 2015]. Retrieved from the Internet: <URL: https://developer.salesforce.com/page/Implementing_Single_Sign-On_Across_Multiple_Organizations>, 15 pages.
Multiple Data Centers. support.ca.com [online]. Copyright 2014 CA [retrieved Jan. 7, 2015]. Retrieved from the Internet: <URL: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452>, 8 pages.
Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.
Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422>, 11 pages.
Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301 >, 6 pages.
Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/E12839_01/web.1111/e13814/webapptune.htm#PERFM368>, 3 pages.
Rivard, J. Clearing Novell Access Manager Application Sessions. Jan. 26, 2009, NetIQ [retrieved Jan. 13, 2016]. Retrieved from the Internet: <URL: https://www.netiq.com/communities/cool-solutions/clearing-novell-access-manager-application-sessions/>, 4 pages.
Stirpe, P. and Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.
Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.
Volodarsky, M. asp.net: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.
U.S. Appl. No. 14/135,053, Final Office Action dated Jul. 6, 2015, 17 pages.
U.S. Appl. No. 14/135,053, Non-Final Office Action dated Jan. 29, 2015, 16 pages.
U.S. Appl. No. 14/135,053, Non-Final Office Action dated Nov. 25, 2015, 18 pages.
U.S. Appl. No. 14/135,053, Notice of Allowance, dated May 20, 2016, 10 pages.
U.S. Appl. No. 14/137,775, Non-Final Office Action dated May 22, 2015, 10 pages.
U.S. Appl. No. 14/137,775, Notice of Allowance dated Sep. 16, 2015, 9 pages.
U.S. Appl. No. 14/491,076, Non-Final Office Action dated Mar. 11, 2016, 13 pages.
U.S. Appl. No. 15/005,365, Non-Final Office Action dated Aug. 24, 2016, 11 pages.
U.S. Appl. No. 14/491,076, Final Office Action dated Oct. 6, 2016, 19 pages.
U.S. Appl. No. 14/491,076, Final Office Action dated Oct. 25, 2016, 18 pages.
U.S. Appl. No. 14/135,053, Notice of Allowance dated Aug. 31, 2016, 9 pages.
Murdoch "Hardened Stateless Session Cookies," Lecture Notes in Computer Science, pp. 93-101 (2008).
Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration.pdf, Dec. 2016, 16 pages.
Dual Factor Authentication, Reliance, Oct. 24, 2016, 8 pages.
Multi-Data Center With Session Sharing, IBM Security Access Manager for Web, Version 7.0, Available Online at https://www.ibm.com/support/knowledgecenter/SSPREK_7.0.0/com.ibm.isam.doc_70/ameb_smsdeploy_guide/concept/c_multi_data_center with_session.html, 2017, 3 pages.

(56) References Cited

OTHER PUBLICATIONS

RSA Adaptive Authentication, RSA Security product literature, Available Online at https://www.rsa.com/en-us/products/fraud-prevention/3d-secure-authentication, 2016, 4 pages.
The ABCs of ADCs, White Paper: ABCs of Application Delivery, Available Online at https://www.fortinet.com/content/dam/fortinet/assets/white-papers/FortiADC-ABCs.pdf, 2014, 8 pages.
U.S. Appl. No. 14/814,209, Non-Final Office Action dated May 14, 2018, 20 pages.
U.S. Appl. No. 15/143,240, Notice of Allowance dated May 24, 2018, 15 pages.
U.S. Appl. No. 15/372,342, Notice of Allowance dated Mar. 13, 2018, 12 pages.
U.S. Appl. No. 15/782,700, Non-Final Office Action dated Jan. 26, 2018, 7 pages.
Nagalakshmi et al., Confident Multi-Factor Authentication on Web Application Via Captcha Technologies, International Journal of Computer Engineering in Research Trends, vol. 2, Issue 8, Aug. 2015, pp. 516-522.
"Developing an Application to Manage Impersonation" *Fusion Middleware Developer's Guide for Oracle Access Management* (Nov. 2012) 10 pages.
"Developing an Application to Manage Impersonation," *Oracle(R) Fusion Middleware Developer's Guide for Oracle Access Management* https://docs.oracle.com/cd/E52734_01/oam/AIDEV/impersonation.htm#AIDEV 422 (Oct. 2016) 11 pages.
"Impersonate another user" Microsoft Dynamics CRM 2015 https://msdn.microsoft.com/en-us/library/gg334744.aspx (Jun. 2015) 1 page.
Ye "A complete Impersonation Demo" http://www.codeproject.com/Articles/125810/A-complete-Impersonation-Demo-in-Csharp-NET (Jun. 2013) 12 pages.
U.S. Appl. No. 14/814,209, Final Office Action dated Jul. 31, 2017, 19 pages.
U.S. Appl. No. 15/143,240, Non-Final Office Action dated Jun. 5, 2017, 11 pages.
Haire, A Solution to SSO Authentication and Identity Management: Lessons Learned, Atlassian Blog, May 16, 2013, 5 pages.
U.S. Appl. No. 14/814,209, Non-Final Office Action dated Jan. 11, 2017, 13 pages.
U.S. Appl. No. 15/005,365, Final Office Action dated Mar. 10, 2017, 12 pages.
U.S. Appl. No. 14/754,222, Notice of Allowance dated May 17, 2017, 5 pages.
U.S. Appl. No. 14/491,076, Notice of Allowance dated Nov. 2, 2017, 11 pages.
U.S. Appl. No. 15/005,365, Notice of Allowance dated Sep. 27, 2017, 16 pages.
U.S. Appl. No. 15/143,240, Final Office Action dated Dec. 15, 2017, 14 pages.
U.S. Appl. No. 15/372,342, Non-Final Office Action dated Oct. 20, 2017, 14 pages.
Dacosta et al., One-Time Cookies: Preventing Session Hijacking Attacks with Stateless Authentication Tokens, ACM Trans. Internet Technol. 12, 1, Article 1, 2012, 31 pages.
Pujolle et al., Secure Session Management With Cookies, 7th International Conference on Information, Communications and Signal Processing (ICICS), 2009, pp. 1-6.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
U.S. Appl. No. 15/707,261, Non-Final Office Action dated Sep. 13, 2018, 10 pages.
Heo et al., "Statistical SIP Traffic Modeling and Analysis System", IEEE, 2010, pp. 1223-1228.
Maruyama et al., "Dynamic Route Selection Algorithms for Session Based Communication Networks", ACM, 1983, pp. 162-169.
U.S. Appl. No. 14/814,209, Final Office Action dated Jan. 4, 2019, 21 pages.
U.S. Appl. No. 15/331,613, First Action Interview Office Action Summary dated May 29, 2019, 7 pages.
U.S. Appl. No. 15/331,613, First Action Interview Pilot Program Pre-Interview Communication dated Jan. 4, 2019, 5 pages.
U.S. Appl. No. 15/331,613, Notice of Allowance dated Jul. 9, 2019, 19 pages.
U.S. Appl. No. 15/707,261, Final Office Action dated Mar. 8, 2019, 6 pages.
U.S. Appl. No. 15/707,261, Notice of Allowance dated Jun. 27, 2019, 5 pages.
U.S. Appl. No. 15/356,384, First Action Interview Pilot Program Pre-Interview Communication dated Feb. 8, 2019, 5 pages.
U.S. Appl. No. 15/15/356,384, Notice of Allowance dated Jun. 12, 2019, 9 pages.

\* cited by examiner

RUN-TIME TRUST MANAGEMENT SYSTEM FOR ACCESS IMPERSONATION

CROSS-REFERENCES TO RELATED APPLICATIONS

This application is a non-provisional application and claims the benefit and priority of U.S. Provisional Application No. 62/245,202, filed on Oct. 22, 2015, entitled "RUN-TIME TRUST MANAGEMENT FOR ACCESS IMPERSONATION," the content of which is herein incorporated by reference in its entirety for all purposes.

BACKGROUND

Generally, the present application relates to data processing. More specifically, the application is related to techniques for managing access by impersonation in an access management system.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to a client (e.g., client application at a device) of the requestor. This token is like a key that can be used to open a door that guards restricted data. For example, a user may attempt to access a human resources database to gather information about certain employees such as salary information. The user's web browser at a client makes a request to the application, which requires authentication. If the web browser does not have a token, the user is asked to log in to the access management system. When the user is authenticated, the user's browser at the client receives a token that may be used to access the human resources application.

In an enterprise, users (e.g., employees) typically may have access to one or more different systems and applications. Each of these systems and applications may utilize different access control policies and require different credentials (e.g., user names and passwords). A user wanting to access multiple resources protected by an access management system may need to be authenticated based on credentials provided to the access management system. A successful authentication gives the user authorization to access the protected resources, based on their assigned access privileges.

Upon authentication, the access management system may establish a session ("user session") to provide the access granted to the protected resource(s). For a user session, the access management system may maintain session information at a computing system (e.g., server computer) for the user session. The session information maintained by access management system may be referred to as a server-side session. The access management system may store session information for the server-side session that defines the access granted to the user and the constraints of the session. The session information for a server-side session may be mapped to a client, which is provided with a token. In the instance where a single sign-on (SSO) session is established, the access management system enforces access for SSO based on the token.

If a user wants to access multiple resources protected the access management system, the access management system may determine whether the user is authenticated to access the multiple resources requested by a user. In some instances, authentication of a user for one resource may suffice for accessing other resources; otherwise, the access management system may request additional credentials from the user. Upon authentication to access multiple resources, the user may not need to re-authenticate to access additional resources. In such instances, the access management system may maintain a single session, such as a single sign-on session (SSO), which provides a user with access to multiple resources after authentication.

Some access management systems may provide a feature ("impersonation") that enables a user ("impersonatee") to designate other users ("impersonators") to act on their behalf for accessing one or more resources. An access management system may enable an impersonatee to temporarily assign his/her privileges to a user who will act as an impersonator of the impersonatee.

An impersonator can initiate a session ("impersonation session") on behalf of an impersonatee to access one or more resources based on the privileges assigned to the impersonator. The access management system may verify that the impersonator is in fact authorized to impersonate the impersonatee. Upon verification of the impersonator, a session may be established as an impersonation session to enable the impersonator to access one or more resources according to the privileges assigned by the impersonatee. The access management system may provide an application for impersonation. An impersonation session can be established using the application.

Access management systems that support impersonation may be limited in enabling an impersonatee to manage and control an impersonation session in a fine-grained manner. New techniques are desired for managing impersonation sessions.

BRIEF SUMMARY

The present disclosure relates to managing impersonation in an access management system. Specifically, techniques are disclosed for run-time management of impersonation sessions in an access management system. The techniques enable run-time configuration and management of trust for an impersonation session.

An access management system can implement a security system that can improve management and security for access to resource by someone else (an "impersonator") other than a person (an "impersonatee") to whom access is provided for the resource. Upon the access management system receiving a request from a user (an "impersonator") to access a resource on behalf of another person (an "impersonatee"), the access management system may determine whether the impersonator is authenticated for access the resource on behalf of the access privilege of the impersonatee to the resource. Such a determination may be performed before providing the impersonator with access to the resource based on the impersonatee's access privilege to the resource. Access to a resource by impersonation may be restricted or limited to less access than given for the resource to the impersonatee. An impersonatee may be presented with an interface at a client device that enables the impersonatee to configure impersonation and the extent to which impersonation is permitted to resources.

Access management systems may be challenges with providing information (e.g., a notification) to an impersonatee about the status of an impersonation session. Specifically, access management systems may be unable to notify an impersonatee about the time period (e.g., start time and end time) of an impersonation session and other information about the impersonation session. Access management systems may not able to configure an impersonation session at run-time and/or manage trust for the impersonation session. For example, an impersonatee may not be able to control access to a resource in a fine-grain manner at run-time such that an access management system can determine access to the resource at the instant that access to the resource is configured. Improvements to access management systems may be beneficial to ensure trust for authentication of an impersonator so that access via impersonation is not compromised. Specifically, it may be useful for an impersonatee to be notified about an attempt to impersonate access, and then enable the impersonatee to control, through configuration and/or explicit approval to the impersonator, for accessing a resource. An access management system disclosed herein facilitates communication with an impersonatee to ensure trust and notification about impersonation.

Authentication of the impersonator may include generating security data having two parts (e.g., a two-part security key). The security data may be generated based on known techniques for key generation. For example, the access management system may generate two security keys that form a two-part security key. A first security key may be sent via a first communication system (e.g., a messaging service) to the impersonatee, and a second security key may be sent via a second communication system (e.g., a messaging service) to the impersonator. The destination where each part of the two-part security keys is sent may be based on a profile for each of the impersonator and the impersonatee. The security data may be sent to a device that is different from the device from which the impersonator seeks to establish an impersonation session. The security data may be sent automatically to both the impersonator and impersonatee. Receipt of the security data provides the impersonatee with notification that a user has requested an impersonation session on behalf of the impersonatee. The security data may be sent with information indicating a time when the impersonation session was requested.

Upon receiving the security data, the impersonator can proceed with estbalishing an impersonation session using both security keys of the two-part security key. The impersonator can obtain one security key of the two-part security key sent to the impersonatee. The security key may be sent via one of many types of electronic communication. The impersonator can submit, via an application on a client device, both security keys to the access management system for verification. By verifying both security keys, the access management system provides greater trust for management of an impersonal session. The access management system can ensure that the impersonator is authorized by an impersonatee because the impersonatee's security key was obtained from the impersonatee. Upon verifying both security keys as being valid, the access management system can establish an impersonation session for the impersonator.

In some embodiments, an access management system may provide an impersonatee with an application that enables the impersonatee to receive information for an impersonation session and to configure the impersonation session. For example, the security data for establishing an impersonation session may be provided to the impersonatee via the application, accessible on a client device operated by the impersonatee. The application may include interactive elements that enable an impersonatee to share the security data with the impersonator. The application may further enable the impersonatee to specify, at run-time (e.g., when an impersonation session is requested), settings for an impersonation session such as an expiration time for an impersonation session and the resource(s) accessible to an impersonator for the impersonation session. The access management system may configure an impersonation session based on these settings configured using the application. The settings may be stored in association with the security data provided to the impersonatee.

The techniques disclosed herein enable an impersonatee to configure an impersonation session at run-time (e.g., when a user requests an impersonation session) per session that is established. By establishing an impersonation session using a two-part security key, the impersonatee can be notified about a request for the session, and can provide explicit approval for the impersonation session by sharing the security key of the two-part security key with an impersonator.

In some embodiments, an access management system may include a computer system that is configured to implement methods and operations disclosed herein. A computer system may include one or more processors and one or more memory accessible to the one or more processors and storing one or more instructions which, upon execution by the one or more processors, causes the one or more processors to implement methods and/or operations disclosed herein. Yet other embodiments relate to systems and machine-readable tangible storage media which employ or store instructions for methods and operations disclosed herein.

In at least one embodiment, a method includes receiving, at a computer system of an access management system, from a first device associated with a first user, a request by the first user for access to a resource at the first device, where access to the resource by the first user is requested based on access to the resource permitted to a second user, and where the first user is different from the second user. The method may include generating security data to provide the first user with access to the resource requested by the first user, where the security data includes first security data and second security data. The method may include sending, from the computer system, the first security data to the first device. The method may include sending, from the computer system, the second security data to a second device associated with the second user. The method may include receiving, by the computer system, first security information from the first device. The method may include receiving, by the computer system, second security information from the first device. The method may include determining whether the received first security information matches first information in the first security data that is sent to the first device from the computer system. The method may include determining whether the received second security information matches second information in the second security data that is sent to the second device from the computer system. The method may include based on determining that the received first security information matches the first information in the first security data and based on determining that the received second security information matches the second information in the second security data, enabling, by the computer system, the first user to access the resource at the first device, where the access to the resource is enabled based on the access to the resource permitted to the second user.

In some embodiments, access to a resource that is enabled for the first user is identical to the access to the resource permitted to the second user. In some embodiments, access to a resource that is enabled for the first user is a portion of the access to the resource permitted to the second user.

In some embodiments, the first security information and the second security information are received together from the first device.

In some embodiments, the first security data is different from the second security data, and where the first security information is different form the second security information. The first security information may include a first access key obtained from the first security data received by the first device from the computer system. The second security information may include a second access key obtained from the second security data sent by the computer system. The first device may obtain the second access key from the second security data. After the second device receives the second security data from the computer system, the second device may send the second security data to the first device. In some embodiments, the first device obtains the second access key from the second security data sent by the second device.

In some embodiments, the method may include, in response to receiving the request by the first user for access to the resource: determining, by the computer system, that access to the resource is not permitted to the second user; denying the first user with the access to the resource at the first device; and sending a message to the first device to indicate that the access to the resource is not permitted.

In some embodiments, the method may include receiving, from the second device, a configuration by the second user of the access to the resource permitted to the first user, where the configuration indicates that the access to the resource by the first user is a portion of the of the access to the resource permitted to the second user.

In some embodiments, the computer system is a first computer system, where the first computer system is different from a second computer system, and where the second computer system provides the resource upon the first computer system enabling the first user to access the resource at the first device.

In some embodiments, upon the computer system enabling access to the resource, access to the resource is provided at the first device via a uniform resource locator (URL), the URL specifying a location where the resource is provided by the second computer system.

In some embodiments, the method includes, based on determining that the received first security information does not match the security information in the first security data or based on determining that the second security information does not match the security information in the second security data: denying access to the resource by the first user through the first device, where the access to the resource is denied based on the access to the resource permitted to the second user.

In some embodiments, enabling the first user to access the resource through the first device includes establishing a session at the computer system, and where the session is established for the first user to access the resource using the first device.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing access to resources by impersonation, or in other words, access based on another's access. A session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

Certain techniques are disclosed for run-time management of impersonation sessions in an access management system. When a user ("impersonator") requests access to impersonate another user ("impersonatee"), the access management system may generate security data having two values (e.g., two security keys). One security key may be sent to the impersonator and a second security key may be sent to the impersonatee. Receipt of the security key by the impersonatee provides the impersonatee with notification that someone has requested to impersonation to access a resource based on the access to the resource permitted to the impersonatee. The impersonatee, if consenting to impersonation, may provide the security key received to the impersonator, thereby implicitly providing the impersonator with trust at run-time to access the resource. The impersonator can provide both security keys to the access management system, which then provides an impersonation session on behalf of the impersonatee upon verification of the security keys.

Some embodiments, such as systems, methods, and machine-readable media are disclosed for enabling run-time management of impersonation sessions.

I. High-Level Overview of an Access Management System for Impersonation

Figure 1:
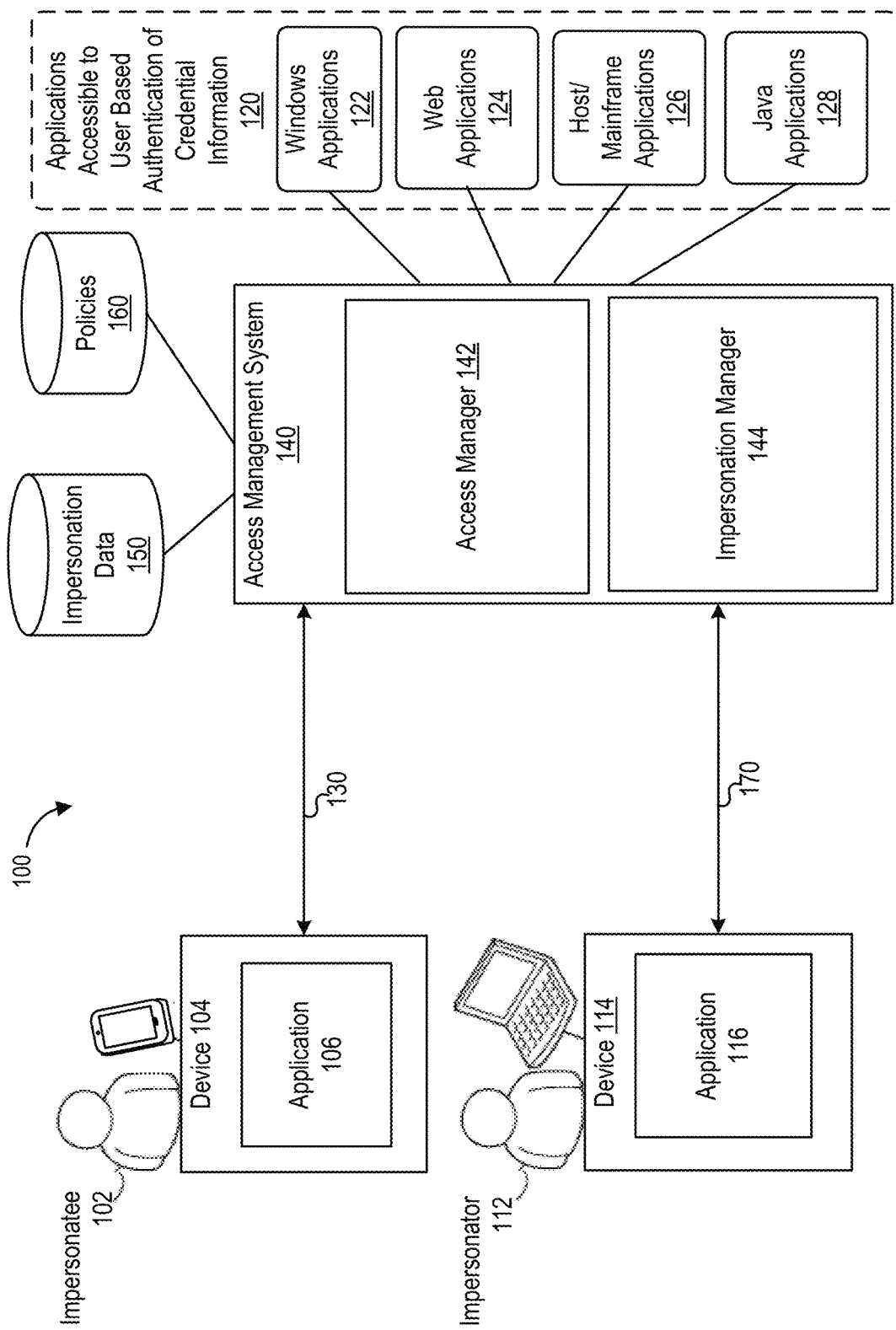
FIG. 1 illustrates a high-level diagram of a system for facilitating impersonation using an access management system.

FIG. 1 illustrates a system 100 in which a user (e.g., user 112), or an "impersonator," operating a client (e.g., computing device 114 or application 116 executing on computing device 114) can initiate a process to impersonate another user (e.g., user 102), or an "impersonatee," to establish a session by impersonation at an access management system 140 to access a resource. Impersonatee 102 may be operating a client (e.g., computing device 104 or application 106 executing on computing device 104) to communicate with access management system 140 and the client operated by impersonator 112. A user, such as impersonator 112, may desire to borrow access to a resource by impersonating impersonatee 102. For purposes of illustration, "session" as disclosed herein includes an SSO session; however, a session may include other types of sessions enabling access to a user, including impersonation sessions, or sessions enabling access by impersonation. A session provides a user with access to a resource according to one or more constraints defined for the session. A session may include an environment that is configured for providing access to a resource. Access management system 140 may provide access one or more resources. Access management system 140 may implement a sign-on system, e.g., a SSO system, which can establish an SSO session to provide access by SSO to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 112 in a SSO system.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager server computers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include access manager 142 and impersonation manager 144, each of which may be implemented in hardware, software (e.g., program code, instructions executable by a processor) executing on hardware, middleware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Each of computing devices 104, 114 may communicate with access management system 140 via one or more communication networks. Access management system 140 may communicate with computing device 104 via one or more communication networks 130. Access management system 140 may communicate with computing device 114 via one or more communication networks 170. Examples of communication networks may include a mobile network, a wireless network, a cellular network, a local area network (LAN), a wide area network (WAN), other wireless communication networks, or combinations thereof.

FIG. 1 shows an example in which user 112 can engage in communication with access management system 140 to establish a session by impersonation, which is facilitated by communication with a client operated by user 102 as an impersonatee. In this example, user 112 operating computing device 114 may attempt to establish a session by impersonation of user 102 to access a resource such as an application 116, e.g., any one of applications 120 or the resources accessible through applications 120. Applications 120 may be accessible to user 112 upon successful authentication of credential information for user 112. Before one of applications 120 is accessible to user 112 at computing device 114, user 112 may initiate an impersonation process to obtain access to one of applications 120, such as application 116. User 112 may not have access to a resource for a variety of reasons, such as lacking authorization of a role to access the resource. User 112 may desire to access a resource temporarily by borrowing access to the resource based on impersonation of another user, such as user 102. Some access management systems may provide a mechanism to enable a user to access a resource based on another's access; however, such systems may be unsecure or may not permit fine-grain control and management of sharing a limited, or a portion (e.g., read) of access (e.g., create, read, update, and delete) to a specific resource. Access may be restricted such that sharing access for multiple resources is terminated to control sharing access to a single resource. Techniques disclosed herein can enable access to a single resource to be shared by an impersonation process disclosed herein. Further, access by impersonation may be provided at a device of the impersonator, such that impersonation is not restricted or limited to a device of the impersonate.

In attempting to access a resource, such as an application, user 112 may operate an application (e.g., application 116) that manages access to a user's account via access management system 140. For example, application 116 is an access management application that may present GUIs, such as those depicted in FIGS. 3-4 to initiate a session by impersonation. Access management system 140 may provide many services including management of access (e.g., granting/denying access) to resources, impersonation management, automatic sign-on, application password change and reset, session management, application credential provisioning, as well as authentication of a session. In some embodiments, access management system 140 can provide SSO features, including automatic single sign-on functionality for resources, such as any one of applications 120, such as Windows® applications, Web application, Java® applications, and mainframe/terminal-based applications running or being accessed from client devices. As explained above, access management system 140 may perform authentication of a user (e.g., user 112) operating a client device (e.g., computing device 114). Authentication is a process by which a user verified to determine that he/she is who he/she claims to be.

In some embodiments, access management system 140 may use one or more policies stored in a data store 160 ("policies") to control access to resources. Policies 160 may include an authentication policy that specifies the authentication methodology to be used for authenticating the user for whom the access must be provided on a given resource. Policies 160 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 160.

Policies 160 may include one or more policies for impersonation. A policy for impersonation may be defined by a user, such as one who intends to be an impersonate. The policy may include a configuration of impersonation for one or more resources. The policy, as well as a configuration of impersonation may be provided by a user through a graphical interface. Impersonation may be configured based on access permitted to the user permitting the impersonation to other users. A user may specify one or more users permitted to impersonate the user for accessing a resource. The user can specify the extent to which access (e.g., permitted and/or prohibited operations) is enabled by other users to a resource accessible to the user. Access may be configured based on access permitted to the user providing the configuration. A policy may be created based on the access configured for enabling impersonation of a user.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as impersonation data 150 and policies 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Access manager 142 may handle processing to determine whether a valid session exists for user 112 to access a resource. Access manager 142 checks for a valid session for user 112 to access a requested resource that is protected. Access manager 142 may assess validity of a session for user 112 based on consideration of one or more access policies applicable to user 112. Based on determining that a valid session does not exist for user 112, access manager 142 may request credential information ("credentials") from user 112. Successful authentication of the credential information may provide the user with access to one or more resources, which may include a requested resource.

Access manager 142 may communicate a request to an impersonator to obtain credential information. The request may be communicated to computing device 114, which in response, prompts user 112 for user credentials to determine authentication of a session. The request may include information (e.g., a URL) to a web page or a user interface (e.g., a web page, portal, or dashboard) to receive credential information. The credential information obtained through the web page or user interface may be communicated to Access Manager 142. Access manager 142 may perform operations to authenticate credential information for user 112. In some embodiments, access manager 142 may store information about sessions established upon successful authentication of a user. For a SSO session, the SSO session may enable access to all resources accessible to user based upon successful authentication of credential information for a user. Access manager 142 can determine resources that are protected and based on authentication sessions, can determine resources that are permitted and/or restricted for a session.

Communications between computing devices 104, 114 and access management system 140 can be received through a gateway system. The gateway system may support access management services. The gateway system may support access management services. For example, a single sign-on (SSO) gateway may implement one or more access agents, such as agent (e.g., web gate agent), to balance and/or handle requests from clients and access management system 140. In some embodiments, access management system 140 may be implemented in system 100 according to an agent-server model for communication between computing devices 114, 104 and any one of access manager servers implemented for access management system 140. The agent-server model may include an agent component (e.g., a gateway system) and a server component. The agent component may be deployed on a host system and the server component may be deployed on a server, e.g., an access manager server. Computing device 114 may be a workstation, personal computer (PC), laptop computer, smart phone, wearable computer, or other networked electronic device.

Access management system 140 may present user 112 with a request for authentication credentials in the form of a challenge (e.g., via the user's web browser at computing device 114). In some embodiments, user 112 can access an SSO user interface through a client executing on computing device 114 or through a web browser on computing device 114. The SSO user interface may be implemented at access management system 140. Access management system 140 may send the SSO user interface or information (e.g., a URL) enabling access to the SSO user interface.

In some embodiments, an SSO user interface can include a list of the applications user 112 commonly utilizes. User 112 can manage their credentials and policies associated with applications through the SSO user interface. When user 112 requests to access an application, e.g., application 140, through the SSO user interface, a request may be sent from computing device 114 to access management system 140 to determine a policy type for the application from one or more policies 160 applicable to user 112. Access management system 140 may determine whether a valid session exists for the user and if so, then it can determine user's 102 credential information based on the policy type.

In some embodiments, the request may include an authentication cookie from a previous login that can be used to determine whether user 112 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on computing device 114. If user 112 is not authorized, then access management system may request credentials from user 112. The SSO user interface may present an interface to receive input including credential information. The credential information may be sent 110 to access management system 140 to determine authentication of user 112.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For resources protected by access management system 140, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

Access management system 140 may provide access to resources via sessions based on impersonation by one user (e.g., impersonator 112) of another user (e.g., impersonatee 102). An access management system can implement a security system that can improve notification and security for impersonation sessions. Impersonation manager 144 may handle processing for operations to enable impersonation.

In at least one example shown in FIG. 1, upon the access management system receiving a request from a user 112 ("impersonator") to access a resource on behalf of an impersonatee 102, the access management system 140 may verify whether the impersonator 102 is authenticated to access the resource as an impersonator 112, before providing the impersonator 112 with access to the resource.

As part of impersonation, impersonation manager 144 may generate security data having two parts (e.g., a two-part security key). Each part may have a different value. The security data may be generated based on known techniques for key generation. For example, the security data may be generated based on one or more hashing algorithms. The security data may be generated based on personal information or other information the impersonatee. In at least one embodiment, impersonation manager 144 may generate two security keys that form a two-part security key. Each value of the security data may be constrained by one or more criteria (e.g., time). Examples of a part of the security data may include a password, a code, a token, a key, or other information that is constraint by one or more criteria. Security data may be generated upon receiving an impersonation request or may be previously generated. Access management system 140 may store security data in a data store 150 ("impersonation data").

One security key (e.g., a first security key) of the security data may be sent via network 130 to the impersonatee 102, and a another security key (e.g., second security key) of the security data may be sent via the network 120 to impersonator 112. The destination where each security key is sent may be based on a profile for each of the impersonator and the impersonatee. The security data sent to the impersonator 112 may be sent to a device that is different from the device 114 from which the impersonator 112 seeks to establish an impersonation session. The security data may be sent automatically to both the impersonator and impersonatee. Receipt of the security data provides the impersonatee with notification that a user has requested an impersonation session on behalf of the impersonatee. The security data may be sent with information about a request for impersonation, such as a time when the impersonation session was requested.

The impersonator 112 may be permitted to access a resource by impersonation based on providing both security keys of the security data. Therefore, the impersonator 112 may be permitted to access a resource by impersonation based on obtain a security key from the impersonatee 102. Upon receiving the security keys, the impersonator 112 can proceed with establishing an impersonation session using both security keys of the two-part security key. The impersonator can obtain one security key of the two-part security key sent to the impersonatee 102. The impersonator 112 can submit, via an application 116, both security keys to the access management system 140 for verification. By verifying both security keys, the access management system 140 provides greater trust for management of an impersonal session. The access management system 140 can be sure that the impersonator is authorized by an impersonatee 102 because the impersonatee's 102 security key was obtained from the impersonatee 102 and not by deceptive means, such as accessing a device of the impersonatee 102. Upon verifying both security keys as being valid, the access management system 140 can establish an impersonation session.

In some embodiments, an access management system 140 may provide an impersonatee with an application 106 that enables the impersonatee 102 to receive information for an impersonation session and to configure the impersonation session. For example, the security data for establishing an impersonation session may be provided to the impersonatee 102 via the application 106. The application 106 may include interactive elements that enable an impersonatee to share the security data with the impersonator. The application may further enable the impersonatee 102 to specify, at run-time (e.g., when an impersonation session is requested), settings for an impersonation session such as an expiration time for an impersonation session and the resource(s) accessible to an impersonator for the impersonation session. The access management system 140 may configure an impersonation session based on these settings. The settings may be stored in impersonation data 150 in association with the security data provided to the impersonatee 102.

II. Sequence for Establishing an Impersonation Session

Figure 2:
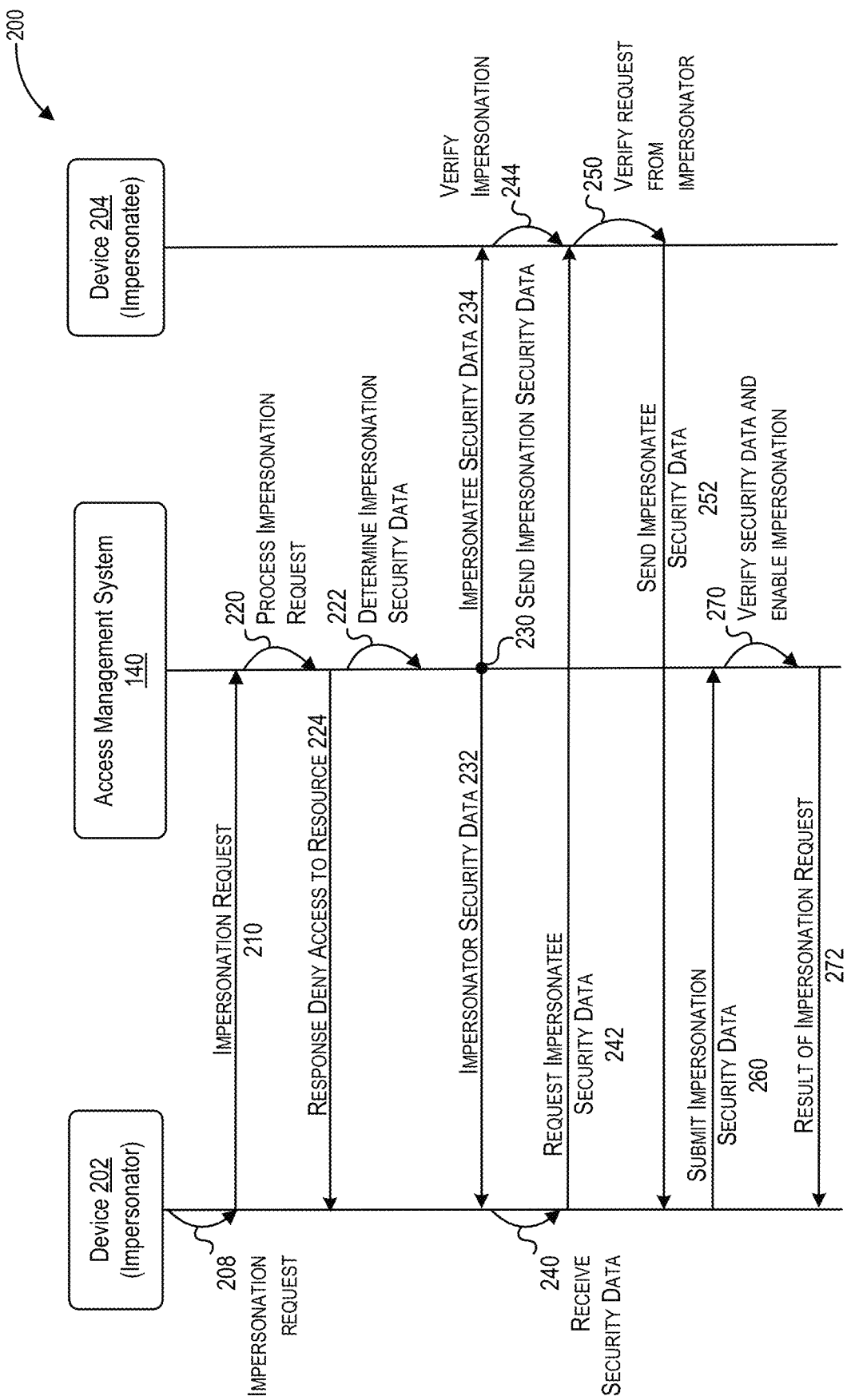
FIG. 2 illustrates a sequence diagram showing operations for facilitating impersonation using an access management system.

Now turning to FIG. 2, is an example of a process 200 for facilitating an impersonation session according to some embodiments. Specifically, process 200 can enable an impersonator 112 requesting an impersonation session from access management system 140 to impersonate an impersonatee 102.

In some embodiments, such as those described with reference to FIGS. 2 and 5, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 2 and 5, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2 and 5 may be described with respect to impersonating a user to access a single resource, such processing may be performed for multiple resources and multiple different users, such that impersonation may be requested each time a different resource is accessed and/or impersonation of different a user is requested. In some embodiments, a single impersonation session may be requested to access multiple resources based on access permitted to another user. Furthermore, additional steps may be added or removed depending on the particular applications. One of ordinary skill in the art would recognize many variations, modifications, and alternatives.

Figure 5:
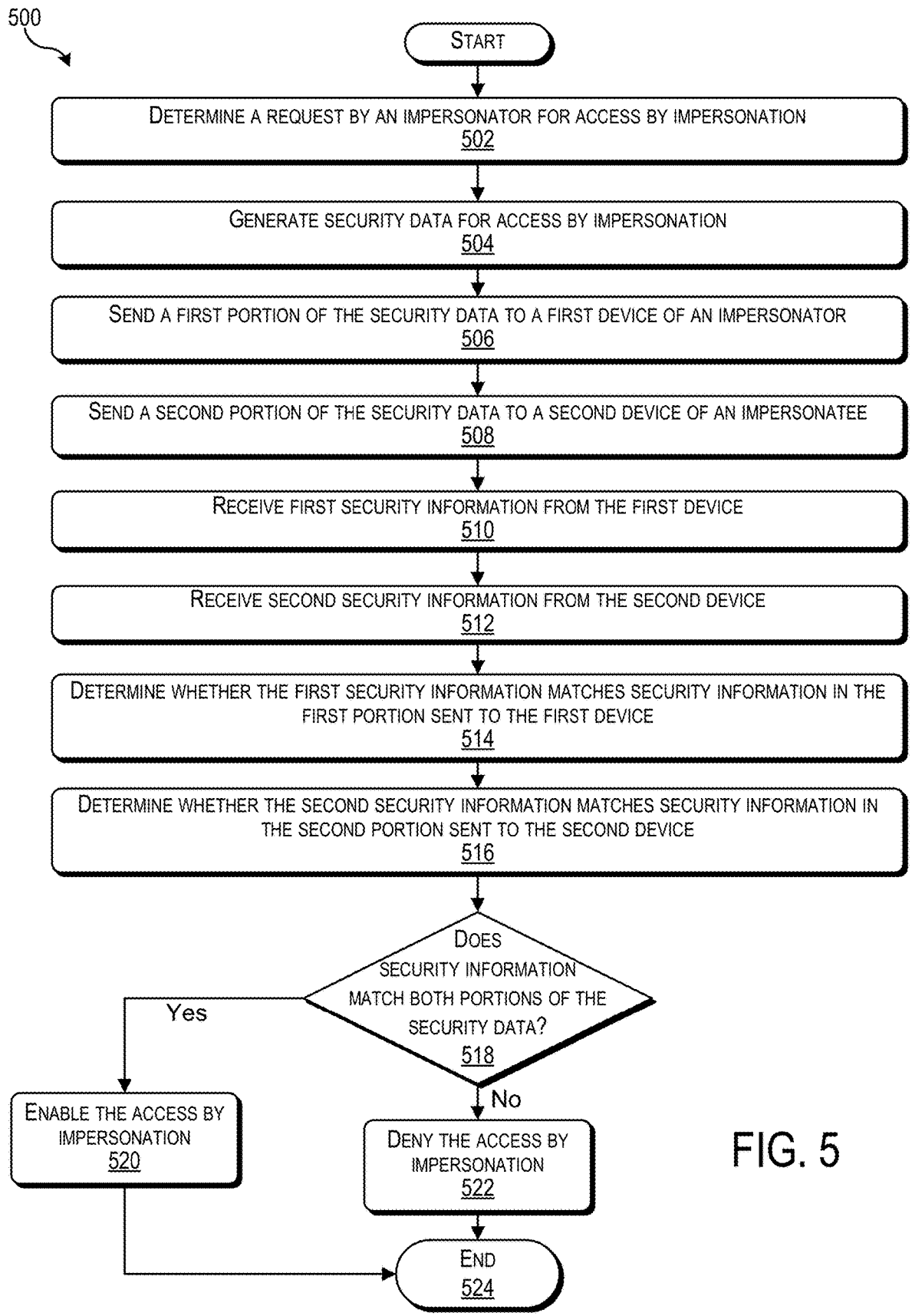
FIG. 5 illustrates a flowchart of a process for facilitating impersonation using an access management system

In an aspect of some embodiments, each process in FIGS. 2 and 5 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

FIG. 2 illustrates a sequence diagram 200 of operations for enabling an impersonation session in access management system (e.g., access management system 140) in accordance with an embodiment.

Starting at step 208, a user ("impersonator") associated with a client (e.g., device 202) may request impersonation ("impersonation request") of another user ("impersonatee") to access a resource accessible to the impersonatee. The impersonator may operate device 202 to request impersonation of the impersonatee. The impersonatee may be associated with a client (e.g., device 204). Device 204 may be operated by the impersonatee.

The impersonation request may be a request for access to a resource based on the access to the resource permitted to the impersonatee. The impersonation request may be received based on input facilitated through an interface, such as one of GUIs illustrated in FIGS. 3-4. Through the interface, an impersonator may provide user identification information, and in some embodiments, access information (e.g., a password), which are included in the request. The interface may enable a user to request access to a resource and specify an user that is to be impersonated. In some embodiments, upon requesting access to a resource at device 202, the interface may be presented to ask the user to specify information for an impersonation session to access the resource. Through the interface, a user can indicate the type of access (e.g., create, read, modify, or delete) request for the resource. As such, the request may indicate the extent to which the resource is to be accessed.

The access to the resource that is permitted to the impersonator may be a part or a portion of the access to the resource permitted to the impersonatee. In some embodiments, the extent of access to the resource permitted to the impersonator may be configurable by the impersonatee. The extent to which the resource is requested for access by the impersonator may be different (e.g., greater) than the access permitted to the resource by the impersonatee.

In response to the impersonation request, at step 210, an impersonation request may be sent to access management system 140. At step 220, access management system 140 may process an impersonation request received at step 210. Processing an impersonation request may include identifying the impersonator based on the impersonator's information (e.g., user identification information and password) included in the impersonator request. Access management system 140 may authenticate the impersonator based on the impersonator's information. In some embodiments, an interface (e.g., a GUI) may be presented to the impersonator at device 202 to request credential information for the impersonator.

Based on processing the impersonation request, access management system 140 can determine whether the impersonator is permitted to access a resource based on impersonation of the impersonatee. Access management system 140 may verify the impersonator's access to determine whether the impersonator can request the impersonation session. Access to request an impersonation session may be based on one or more policies for access applicable to the impersonator. Access management system 140 may permit an impersonation request based on determining that the impersonator is permitted to request an impersonation session upon authentication of the impersonator. A impersonation policy may be defined to indicate attributes for an impersonation session, such as whether an impersonator can request an impersonation session, whom an impersonator can impersonate, and resources for which impersonation is permitted and/or not permitted. A policy may be configured by an enterprise that controls access to resources.

In some embodiments, impersonation of the impersonatee may be defined by the impersonatee. The impersonatee may define (e.g., by an impersonation policy) who can impersonate the impersonatee, what access is permitted by impersonation, and the scope of the access permitted by the impersonation. The impersonatee may modify access to a resource based on the access to the resource permitted to the impersonatee. For example, the impersonatee may revoke access to the resource. An impersonation request may be denied if the impersonation request is received after the access to the resource is revoked by the impersonatee. Impersonation may be managed at any time, including a time when an impersonation session is active. An impersonatee may control any aspect of an impersonation session. An impersonatee may control access for any other device registered with the impersonatee by access management system 140.

In some embodiments, access to a resource by impersonation may be based or limited by the access to the resource permitted to the impersonatee. Access management system 140 may determine whether the impersonatee actually has access to the resource requested by the impersonator. Thus, access management system 140 may determine the access permitted to the impersonatee. Access management system 140 may assess access to a resource requested by the impersonation request. Access may be assessed based on an impersonation policy that defines impersonation to access the resource as an impersonator of the impersonatee.

Processing an impersonation request at step 220 may include access management system 140 determining that access to a resource based on the impersonation request is to be denied. The impersonation request may be denied based on the impersonatee not having access to a resource that is requested, or the impersonatee revoking access to the resource. In some embodiments, access may be denied upon determining that the impersonation request is for more, or greater access than permitted for impersonation. The access to a resource for impersonation may be limited by the impersonatee or by the access permitted to the impersonatee.

At step 224, access management system 140 may send a response to device 202 to indicate that access to a resource for the impersonation request is not permitted, or denied when determined at step 220.

At step 222, based on determining that impersonation is to be permitted for the impersonation request, access management system 140 may perform actions to provide the impersonator with access to a resource requested for an impersonation session. One action may include access management system 140 determining security data. Security data may be pre-generated and stored for accessing a resource by impersonation. The security data may be generated dynamically (e.g., upon request at run-time) for an impersonation request. For example, access management system 140 may generate security data to provide the impersonator with access to the resource requested by the impersonator. The security data may include two parts (or portions), a first part comprising security data for the impersonator and a second part comprising security data for the impersonate. Security data may be determined using one or more techniques, such as encryption, hashing, or other algorithmic based function to generate a unique value. Impersonation security data may include a first value (e.g., a first security key) and a second value (e.g., second security key). The first value and the second value may be different. The security data may be generated based on information about the impersonatee and/or impersonator to further ensure uniqueness. Each of the first value and second value may be generated using different techniques. Each of the first value and the second value may be generated based on shared data, e.g., a security key. In some embodiments, the first value may be generated based on the second value, or vice versa. By coupling the generation of the values forming the security data, greater trust for impersonation is ensured, where impersonation is permitted based on an impersonator supplying both values. Although security data is described as comprising two portions, the security data may include any number of portions, such as two or more values.

At step 230, access management system 140 may send a portion of the security data to the impersonator at one or more destinations (e.g., device 202) associated with the impersonator and may send a different portion of the security data to one or more destinations (e.g., device 204) associated with the impersonatee. The portion sent to different destinations may each themselves be different, such that the security data includes a different value for each different destination to which a portion of the security data is sent. The destination(s) may be associated with a user by a profile associated with the user. The profile may be specified as part of an registration process with access management system 140. Each of the destination(s) may be a location that at which the impersonatee can be notified about an impersonation request to impersonate the user (impersonatee). Destinations may include a client, an email address, a telephone number, or other location where a communication can be sent. In some embodiments, a user can specify a destination of an impersonator or an impersonatee where a portion of security data is to be sent.

At step 232, access management system 140 may send a first value (e.g., impersonator's security key) of the values in the security data to device 202 associated with the impersonator. The impersonator's security key may sent via a communication system (e.g., a messaging service) to the impersonator. The destination where the security key is sent may be based on a profile for impersonator. The destination may be different from device 202 from which the impersonator seeks to establish an impersonation session.

At step 234, access management system may send a second value (different from the first value) (e.g., impersonatee's security key) of the two values in the security data to one or more destinations, via a communication system (e.g., a messaging service) associated with the impersonatee. For example, the second value may be sent to device 204 associated with the impersonatee. In some embodiments, the value may be sent to device 204 with information indicating the impersonator that has requested an impersonation session and/or the resource to be accessed by the impersonation.

Receipt of a value of the security data from access management system 140 provides the impersonatee with notification that someone (the impersonator) has requested impersonation of the impersonatee. In some embodiments, an application on device 204 may display information about an impersonation request, such as information sent at step 234. The information may indicate when an impersonation request was received, where it was sent from, and other information about the impersonation request. The application may enable impersonatee to choose an action for the impersonation request. At step 244, the impersonatee may operate device 204 to verify the impersonation request. When provided, the impersonatee can review information received at step 234 to determine whether the impersonator should be granted access to the resource. In some embodiments, the impersonatee can send a communication back to access management system 140 to permit or deny an impersonation request.

At step 240, the impersonator may operate device 202 to receive a portion of the security data. The impersonator may obtain the impersonatee's security key from the impersonatee. At step 242, the impersonator may operate device 202 to send a request to device 204 for the impersonatee's key. Communication between device 202 and device 204 may be out-of-band such that device 202 communicates with another device, device 204, that is not the access management system 140. Out-of-band communication may assure that the security data is securely commuicated to an impersonatee, and not being obtained by an unauthorized party. In some embodiments, the impersonator may communicate with the impersonatee in person or via some other communication means to obtain the impersonatee's security key. In one example, device 204 may provide an application that enables the impersonatee to determine how to communicate the security data device 204 receives from access management system 140. Obtaining the impersonatee's security key from the impersonatee provides consent from the impersonatee enabling the impersonator to access a resource as the impersonatee.

At step 250, the impersonatee may review a request from the impersonator to determine whether to consent to impersonation, by sending the impersonatee's security key. In other words, the impersonatee may verify the request from the impersonator for the impersonatee's security key. Upon determining to consent to impersonation by the impersonator, the impersonatee may communicate with the impersonator to provide the impersonatee's security key. For example, at step 252, the impersonatee may operate client device 204 to send the impersonatee's security key to device 202 associated with the impersonator.

Figure 4:
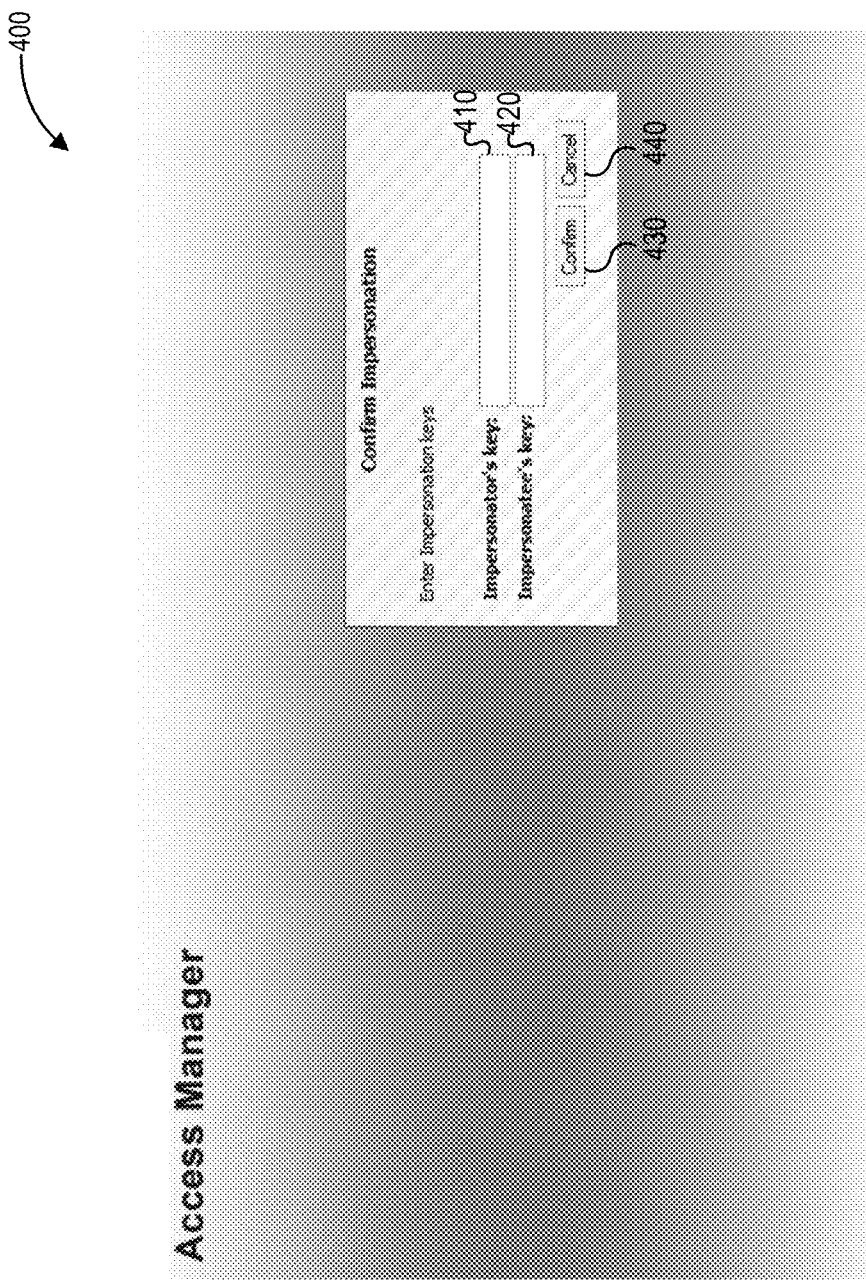

At step 260, the impersonator may have receive the impersonatee's security key. The impersonator may operate device 202 to send the impersonator's security key and the impersonatee's security key to the access management system 140 to establish a session for impersonation. For example, the impersonator may submit, to access management system 140, the impersonator's security key and the impersonatee's security key in the GUI of FIG. 4 presented at device 202.

At step 270, access management system 140 may receive the impersonator's security key and the impersonatee's security key from the device 202. Access management system 140 may verify the security keys by determining whether the security keys match the security data generated at step 222. Access management system may combine both security keys and then compare the combination to security data previously generated to verify whether the security keys match the generated security data. Upon determining that the security keys do not match the security data generated at step 222, access management system 140 may deny access to a resource by impersonation. Access management system 140 may store data indicating that access to a resource is to be denied and therefore, access management system 140 may prevent creating a session for impersonation. In some embodiments, Upon determining that the security keys match the security data generated at step 222, access management system 140 may enable the impersonator to access a resource based on access to the resource for the impersonatee. Enabling access to the resource may include storing information indicating the resources that are accessible to the impersonatee. In some embodiments, the operations described with reference to FIG. 2 may be performed for each resource for which access is requested by impersonation, or may be performed for a set of resources. Access management system 140 may establish a session ("impersonation session") for accessing the resource requested at step 210. The session may be established based on determining that the security keys matched the generated security data. In an access management system that supports SSO access, the impersonation session may not support SSO, such that when the session expires, the impersonator may need to request impersonation again. Access to a resource may be restricted via the session based on a configuration provided by the impersonatee to access management system 140. The configuration may indicate whether a SSO impersonation session is permitted, a time period for the impersonation session, or other criteria for an impersonation session.

At step 272, access management system 140 may send a response as to the request for impersonation at step 210. The response may include a result of the request. The response may include information to enable access to a resource through access provided at step 270. Device 202 may operate in response to the response received from access management system 140. For example, device 202 may display information in a GUI that indicates the result of the request for impersonation.

III. Graphical Interfaces to Establish an Impersonation Session

Figure 3:
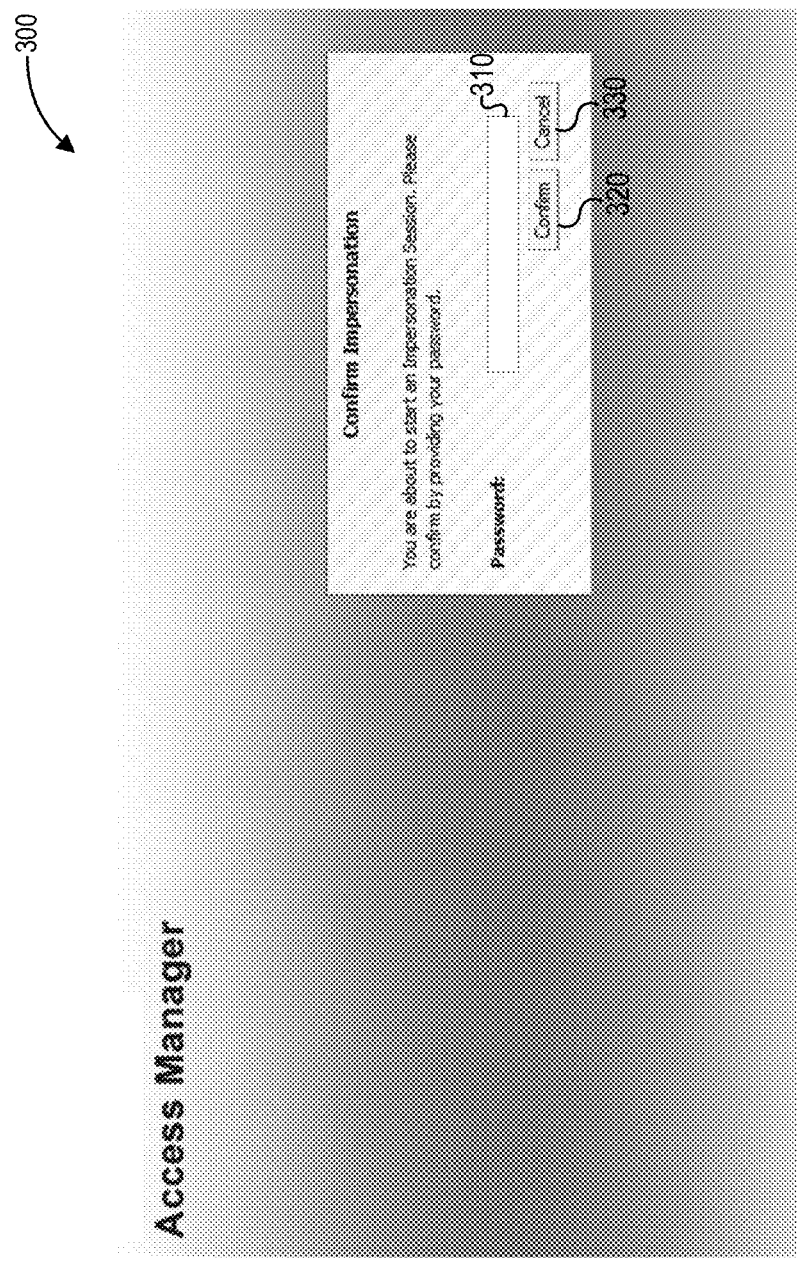
FIGS. 3 and 4 illustrate graphical user interfaces (GUIs) of a process for facilitating impersonation using an access management system.

FIGS. 3-4 illustrate graphical interfaces (e.g., GUIs) for run-time management of an impersonation session in an access management system, in accordance with an embodiment. The graphical interfaces may enable an impersonator to establish an impersonation session. Each of the graphical interfaces may be generated at access management system 140, at a client (e.g., client 114) associated with an impersonator, or a combination thereof. The graphical interfaces may be rendered on a client associated with an impersonator. For example, the graphical interfaces may be accessed at an application (e.g., application 116 of FIG. 1) of a client associated with an impersonator.

Now turning to FIG. 3, a GUI 300 is depicted that enables a user ("impersonator") to request an impersonation session to access a resource. GUI 300 may include one or more interactive elements to enable a user to request an impersonation session to access a resource accessible to another user (e.g., an impersonatee). For example, GUI 300 may be presented at ste 208 of FIG. 2 to facilitate an impersonator to establish an impersonation session. In some embodiments, GUI 300 may include an interactive element to specify information (e.g., user identification information) identifying a user to impersonate. GUI 300 may include interactive element 310 ("Password") to receive information about the impersonator including user identification and access information (e.g., a password). Upon receiving a request to impersonate a user, an access management system may authenticate the impersonator based on information provided in GUI 300 before determining whether it can provide an impersonation session.

GUI 300 may include interactive element 320 ("Confirm") to confirm, or request an impersonation session. GUI 300 may include interactive element 330 ("Cancel") to cancel, or prevent a request for an impersonation session from being submitted.

Now turning to FIG. 4, a GUI 400 is shown for receiving security data to authenticate an impersonator for access to a resource based on access provided to an impersonatee. GUI 400 may include interactive element 410 ("impersonator's key") that receives as input a value (e.g., security key) included in the security data generated by an access management system. The impersonator's key will be received from the access management system. GUI 400 may include interactive element 420 ("impersonatee's key") that receives as input a value (e.g., security key) included in the two-part security data generated by an access management system. The impersonatee's key may be received from the impersonatee via electronic communication or verbal communication. Receipt of the impersonatee's key is on way for the impersonatee to consent to an impersonation session for the impersonator.

Interactive element 430 in GUI 400 may be interactive to receive input from the impersonator to request submission of the Impersonatee's key and the Impersonator's key to the access management system. Interactive element 440 may be interactive to cancel the request for an impersonation session. In some embodiments, GUI 400 may include one or more interactive elements to request access management system to re-generate one or both of the Impersonatee's key or the Impersonator's key.

IV. Establishing Trust Impersonation Session at Run-Time

FIG. 5 illustrates a process 500 for facilitating an impersonation session at run-time according to some embodiments. Process 500 may be implemented by access management system 140 of FIG. 1.

Process 500 may begin at step 502 by an access management system determining a request for access by impersonation. A request may be determined based on a request received from a device operated by a user who desires to impersonate another user. In some embodiments, determining a request may include receiving, from a device (e.g., a first device) associated with a user (e.g., a first user or an impersonator), a request by the first user for access to a resource at the first device. Access to the resource by the first user may have been requested based on access to the resource permitted to another user (e.g., a second user or an impersonate). The first user may be different from the second user. The request for access to the resource from the second user may be less than the access permitted to the second user. Determining the request may include determining information about the first user from the request. Determining the request may include determining information about the second user from the request.

In some embodiments, a request to access a resource may be processed to determine whether access to the resource is permitted to another user, or impersonatee. The user of the request may be denied access to the resource at the device from which access is requested. The access management system may send a message to the device to indicate that access to the resource is not permitted.

In some embodiments, a user, or impersonatee may configure access to a resource by an impersonator. An access management system may receive, from a device of the impersonatee, a configuration by the impersonatee of the access to the resource permitted to the impersonator. The configuration may indicate that the access to the resource by the impersonator is for a portion of the of the access to the resource permitted to the impersonatee. The configuration may be received at any time relative to any of the steps in process 500. The access management system may determine access for impersonation based on the configuration, when received.

At step 504, security data is generated to provide the first user with access to a resource permitted to the second user. The security data may be generated by an access management system. The security data may include multiple portions of data. In at least one embodiment, the security data may be generated to include a first portion, or first security data, and a second portion, or second security data. The first security data may be different or similar to the second security data. Each portion of the security data may be generated to include security information. The security information may be distinct from security information in other portion(s) of the security data. Security information may include information for determining security for a session, such as authentication information. For example, security information may include a value, such as an access key or security key. An access key may be generated using one or more techniques, such as hashing, encryption, or other techniques for generating a unique value.

Different portions of the security data may be communicated to different devices, such as a device (e.g., first device or impersonator's device) operated by the first user and a device (e.g., a second device or an impersonatee's device) operated by a second user. At step 506, an access management system may send a first portion of the security data (e.g., first security data) to the first device associated with the first user. At step 508, the access management system may send a second portion of the security data (e.g., second security data) to the second device associated with the second user. In some embodiments, the first portion and the second portion may be sent concurrently or in a different order. The first portion may be sent to more than one device associated with the first user. The second portion may be sent to more than one device associated with the second user. Each of the devices may process the portion of the security data to extract security information (e.g., a value) for determining security to establish an impersonation session.

In some embodiments, an impersonatee may operate a device (e.g., the second device) that receives a portion of the security data to configure access to a resource at run-time.

The portion of the security data sent to the device of the impersonate may include information about the request for impersonation to access a resource based on the access of the impersonate. The device may provide an application that enables the impersonatee to view and manage impersonation for a resource. Impersonation may be managed using the portion of the security data. Specifically, when an impersonate requests to modify impersonation, the device may send the request including one or more attributes for the impersonation session, to the access management system. The request may be sent with security information obtained from the portion of the security data received by the device. Attributes for an impersonation session may include an expiration time for the impersonation and operations that are permitted/denied for a resource accessible by the impersonation session. The access management system will use the security information to verify whether it is included in the portion of the security data originally sent to the device. The attributes for an impersonation session will be stored and associated with the session upon successful verification of the security information. In addition to providing the portion of the security data to the device associated with the impersonator, the impersonatee can further control impersonation by explicit approval and/or configuration at the device associated with the impersonatee.

At step 510, an access management system may receive security information (e.g., first security information), such as a first access key, from the first device. The first security information may be received from the impersonator. The first security information may be extracted from the first portion of the security data received by the first device. At step 512, the access management system may receive security information (e.g., second security information), such as a second access key, from the first device. In some embodiments, the first security information and the second security information may be received concurrently from the access management system. That is, the first device may send the first security information and the second security information currently to the access management system.

The first device may receive the second portion of the security data, or the second security information, from the second device. In some embodiments, after the second device receives the second portion of the security data from an access management system, the second device sends the second portion of the security data to the first device. The first device obtains the second security information from the second portion of the security data received from the second device.

At step 514, a determination is made whether the received first security information matches first security information in the first security data that is sent to the first device. In other words, the received first security information is compared to the security information in the first portion of the security data that was sent to the first device. At step 516, a determination is made whether the received second security information matches second security information in the second portion of the security data that is sent to the second device.

At step 518, the determination as to whether the received security information matches each portion of the security data is evaluated. At step 520, based on determining that the received first security information matches the first security information in the first portion of the security data and based on determining that the received second security information matches the second security information in the second portion of the security data, access to a resource is enabled at the device that requested access by impersonation. Access to the resource is permitted based on the access permitted to the second user, or impersonatee. The access to the resource that is enabled for the first user may be identical to the access to the resource permitted to the second user. The access to the resource that is enabled for the first user is a portion of the access to the resource permitted to the second user. Upon enabling access to a resource at a device, access to the resource may be provided at the device by a uniform resource locator (URL), which specifies a location where the resource is accessible. In some embodiments, the resource may be accessible at a computer system that is different from an access management system. Enabling a user to access the resource through a device includes establishing a session at the access management system. The session enables the user to access the resource at the computer system that provides the resource. Process proceeds to end at step 524.

At step 522, based on determining that the received first security information does not match the first security information in the first portion of the security data or based on determining that the received second security information does not match the second security information in the second portion of the security data, access a resource is denied at the device that requested access by impersonation. For example, the first user may be denied access to the resource at the first device. Access may be denied to a resource when security information from either portion of the security data sent to devices does not match that which was generated. Denying access may prevent an unauthorized user from improperly obtaining access to a resource as an impersonator. Process 500 proceeds to end at step 524.

Figure 6:
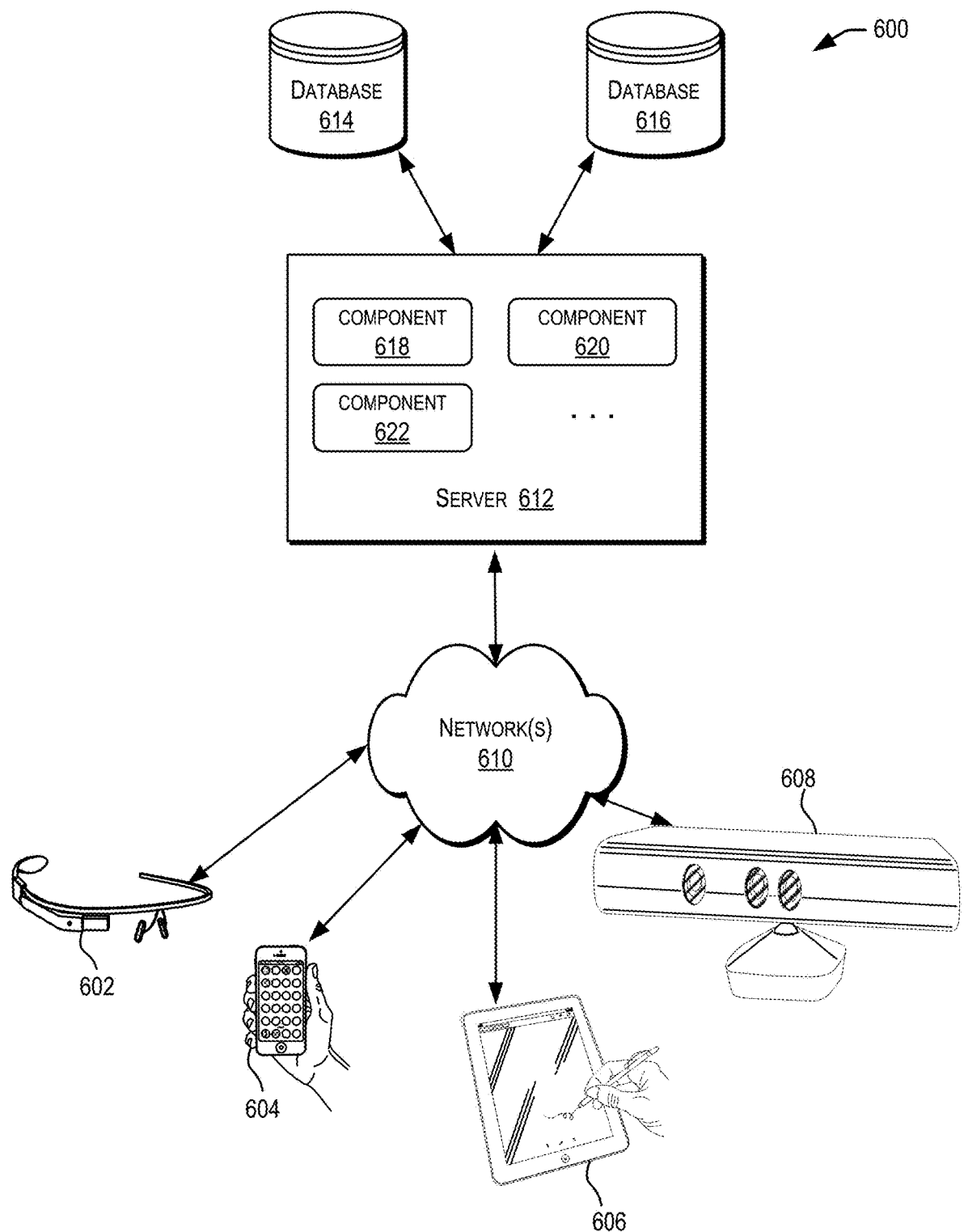
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications. In certain embodiments, server 612 may also provide other services or software applications can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present disclosure. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle that are adapted to store, update, and retrieve data in response to SQL-formatted commands.

Figure 7:
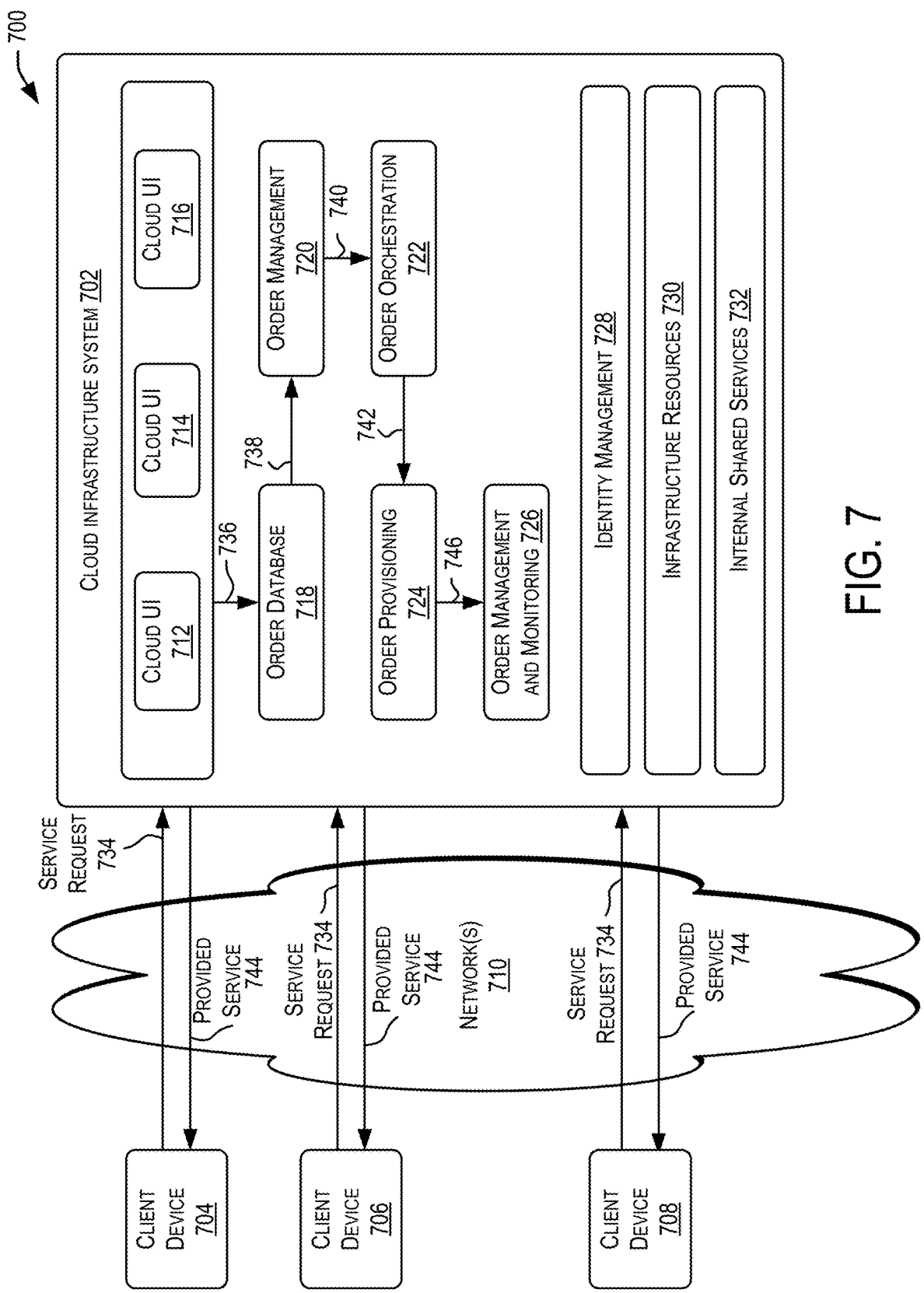
FIG. 7 illustrates a simplified block diagram of one or more components of a system environment in which services may be offered as cloud services, in accordance with an embodiment.

In some embodiments, a cloud environment may provide one or more services. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the present disclosure. In some other embodiments, cloud infrastructure system 702 may have more or fewer components than shown in the figure, may combine two or more components, or may have a different configuration or arrangement of components.

Client computing devices 704, 706, and 708 may be devices similar to those described above for client computing devices 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between client computing devices 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at step 734, a customer using a client device, such as client computing devices 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At step 736, the order information received from the customer may be stored in an order database 718. If this is a new order, a new record may be created for the order. In one embodiment, order database 718 can be one of several databases operated by cloud infrastructure system 718 and operated in conjunction with other system elements.

At step 738, the order information may be forwarded to an order management module 720 that may be configured to perform billing and accounting functions related to the order, such as verifying the order, and upon verification, booking the order.

At step 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at step 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At step 744, once the services and resources are provisioned, a notification may be sent to the subscribing customers indicating that the requested service is now ready for use. In some instance, information (e.g. a link) may be sent to the customer that enables the customer to start using the requested services.

At step 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
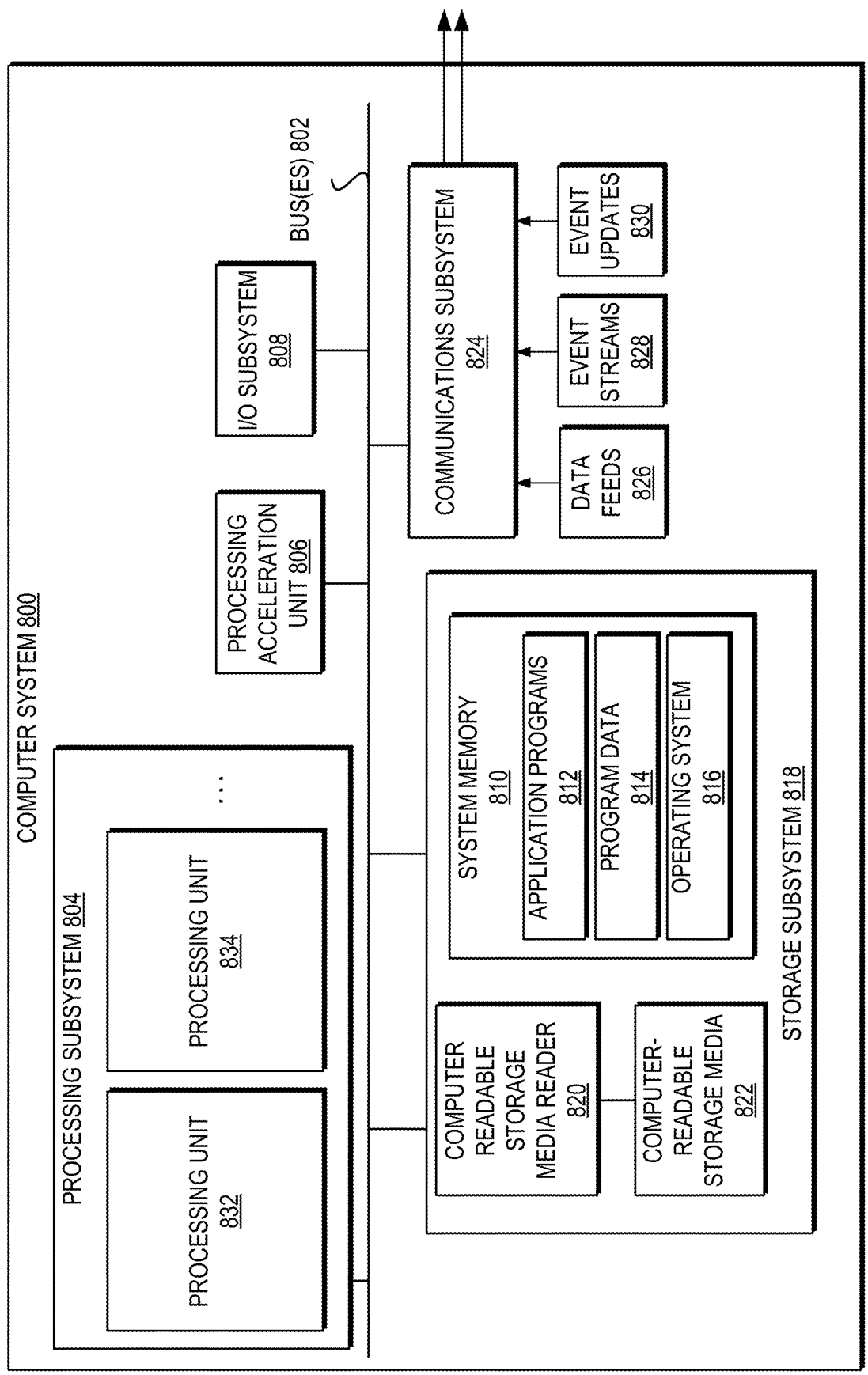
FIG. 8 illustrates an exemplary computer system that may be used to implement an embodiment.

FIG. 8 illustrates an exemplary computer system 800 that may be used to implement an embodiment of the present disclosure. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client computing devices via the Internet for receiving and sending information from and to the client computing devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes disclosed herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, at a computer system of an access management system, from a first device associated with a first user, a request by the first user for access to a resource at the first device, wherein access to the resource by the first user is requested based on access to the resource permitted to a second user, and wherein the first user is different from the second user;
   in response to receiving the request by the first user for access to the resource, processing the request, which includes: (i) authenticating the first user based on credential information for the first user, and (ii) determining whether the first user is authorized to access the resource on behalf of the second user based on a policy for impersonation of the second user by the first user;
   based on determining that the first user is authenticated and authorized to access the resource on behalf of the second user, generating security data to provide the first user with access to the resource requested by the first user, wherein the security data includes first security data for the first user and second security data for the second user;
   sending, from the computer system, the first security data to the first device;
   sending, from the computer system, the second security data to a second device associated with the second user;
   receiving, by the computer system, first security information from the first device;
   receiving, by the computer system, second security information from the first device;
   determining whether the received first security information matches first information in the first security data that is sent to the first device from the computer system;
   determining whether the received second security information matches second information in the second security data that is sent to the second device from the computer system; and
   based on determining that the received first security information matches the first information in the first security data and based on determining that the received second security information matches the second information in the second security data: enabling, by the computer system, the first user to access the resource at the first device, wherein the access to the resource is enabled based on the access to the resource permitted to the second user.

2. The method of claim 1, wherein the access to the resource that is enabled for the first user is identical to the access to the resource permitted to the second user.

3. The method of claim 1, wherein the access to the resource that is enabled for the first user is a portion of the access to the resource permitted to the second user.

4. The method of claim 1, wherein the first security information and the second security information are received together from the first device.

5. The method of claim 1, wherein the first security data is different from the second security data, and wherein the first security information is different from the second security information.

6. The method of claim 5, wherein the first security information includes a first access key obtained from the first security data received by the first device from the computer system, and wherein the second security information includes a second access key obtained from the second security data sent by the computer system.

7. The method of claim 6, wherein the first device obtains the second access key from the second security data.

8. The method of claim 1, wherein after the second device receives the second security data from the computer system, the second device sends the second security data to the first device.

9. The method of claim 1, further comprising:
in response to receiving the request by the first user for access to the resource:
determining, by the computer system, that access to the resource is not permitted to the second user;
denying the first user with the access to the resource at the first device; and
sending a message to the first device to indicate that the access to the resource is not permitted.

10. The method of claim 1, wherein the computer system is a first computer system, wherein the first computer system is different from a second computer system, and wherein the second computer system provides the resource upon the first computer system enabling the first user to access the resource at the first device.

11. The method of claim 10, wherein upon the first computer system enabling access to the resource, access to the resource is provided at the first device via a uniform resource locator (URL), the URL specifying a location where the resource is provided by the second computer system.

12. The method of claim 1, further comprising:
based on determining that the received first security information does not match the security information in the first security data or based on determining that the second security information does not match the security information in the second security data:
denying access to the resource by the first user through the first device, wherein the access to the resource is denied based on the access to the resource permitted to the second user.

13. The method of claim 1, wherein enabling the first user to access the resource through the first device includes establishing a session at the computer system, and wherein the session is established for the first user to access the resource using the first device.

14. A system of an access management system, the system comprising:
one or more processors; and
a memory accessible by the one or more processors, the memory storing one or more instructions that, upon execution by the one or more processors, cause the one or more processors to:
receive, from a first device associated with a first user, a request by the first user for access to a resource at the first device, wherein access to the resource by the first user is requested based on access to the resource permitted to a second user, and wherein the first user is different from the second user;
in response to receiving the request by the first user for access to the resource, processing the request, which includes: (i) authenticating the first user based on credential information for the first user, and (ii) determining whether the first user is authorized to access the resource on behalf of the second user based on a policy for impersonation of the second user by the first user;
based on determining that the first user is authenticated and authorized to access the resource on behalf of the second user, generate security data to provide the first user with access to the resource requested by the first user, wherein the security data includes first security data for the first user and second security data for the second user;
send the first security data to the first device;
send the second security data to a second device associated with the second user;
receive first security information from the first device;
receive second security information from the first device;
determine whether the received first security information matches first information in the first security data that is sent to the first device from the computer system;
determine whether the received second security information matches second information in the second security data that is sent to the second device from the computer system; and
based on determining that the received first security information matches the first information in the first security data and based on determining that the received second security information matches the second information in the second security data: enable the first user to access the resource at the first device, wherein the access to the resource is enabled based on the access to the resource permitted to the second user.

15. The system of claim 14, wherein the first security data is different from the second security data, wherein the first security information includes a first access key obtained from the first security data received by the first device from the computer system, wherein the second security information includes a second access key obtained from the second security data sent by the computer system.

16. The system of claim 15, wherein the second device sends the second security data to the first device after the second device receives the second security data sent by the computer system, and wherein the first device obtains the second access key from the second security data sent by the second device.

17. The system of claim 14, wherein the one or more instructions which, upon execution by the one or more processors, further causes the one or more processors to:
receive, from the second device, a configuration by the second user of the access to the resource permitted to the first user, wherein the configuration indicates that the access to the resource by the first user is a portion of the of the access to the resource permitted to the second user.

18. A non-transitory computer-readable medium storing one or more instructions that, upon execution by one or more processors, causes the one or more processors to:
  receiving, at a computer system of an access management system, from a first device associated with a first user, a request by the first user for access to a resource at the first device, wherein access to the resource by the first user is requested based on access to the resource permitted to a second user, and wherein the first user is different from the second user;
  in response to receiving the request by the first user for access to the resource, processing the request, which includes: (i) authenticating the first user based on credential information for the first user, and (ii) determining whether the first user is authorized to access the resource on behalf of the second user based on a policy for impersonation of the second user by the first user;
  based on determining that the first user is authenticated and authorized to access the resource on behalf of the second user, generating security data to provide the first user with access to the resource requested by the first user, wherein the security data includes first security data for the first user and second security data for the second user;
  sending, from the computer system, the first security data to the first device;
  sending, from the computer system, the second security data to a second device associated with the second user;
  receiving, by the computer system, first security information from the first device;
  receiving, by the computer system, second security information from the first device;
  determining whether the received first security information matches first information in the first security data that is sent to the first device from the computer system;
  determine whether the received second security information matches second information in the second security data that is sent to the second device from the computer system; and
  based on determining that the received first security information matches the first information in the first security data and based on determining that the received second security information matches the second information in the second security data: enabling, by the computer system, the first user to access the resource at the first device, wherein the access to the resource is enabled based on the access to the resource permitted to the second user.

19. The non-transitory computer-readable medium of claim 18, wherein the second device sends the second security data to the first device after the second device receives the second security data sent by the computer system, and wherein the first device obtains the second information from the second security data sent by the second device.

20. The non-transitory computer-readable medium of claim 18, wherein the one or more instructions which, upon execution by the one or more processors, further causes the one or more processors to:
  receive, from the second device, a configuration by the second user of the access to the resource permitted to the first user, wherein the configuration indicates that the access to the resource by the first user is a portion of the of the access to the resource permitted to the second user.

* * * * *

UNITED STATES PATENT AND TRADEMARK OFFICE
CERTIFICATE OF CORRECTION

PATENT NO. : 10,581,826 B2
APPLICATION NO. : 15/291804
DATED : March 3, 2020
INVENTOR(S) : Kukehalli Subramanya et al.

Page 1 of 1

It is certified that error appears in the above-identified patent and that said Letters Patent is hereby corrected as shown below:

On the Title Page

Column 1, Item (73) under Assignee, Line 2, delete "Shores" and insert -- Shores, (US) --, therefor.

On page 3, Column 1, under Other Publications, Line 2, delete "http://ww.ca.com" and insert -- http://www.ca.com --, therefor.

In the Specification

In Column 4, Line 2, delete "estbalishing" and insert -- establishing --, therefor.

In Column 5, Line 57, delete "of the of the" and insert -- of the --, therefor.

In Column 6, Line 37, delete "system" and insert -- system. --, therefor.

In Column 18, Lines 24-25, delete "In some embodiments,".

In Column 19, Line 11, delete "ste" and insert -- step --, therefor.

In Column 20, Line 23, delete "of the of the" and insert -- of the --, therefor.

In the Claims

In Column 37, Line 2, in Claim 17, delete "of the of the" and insert -- of the --, therefor.

In Column 38, Line 32, in Claim 20, delete "of the of the" and insert -- of the --, therefor.

Signed and Sealed this
Tenth Day of November, 2020

Andrei Iancu
*Director of the United States Patent and Trademark Office*